Dec. 22, 1931.   H. B. SHEPPARD   1,837,590
MEANS FOR PUMPING LUBRICANT
Filed Sept. 8, 1928   2 Sheets-Sheet 1

HENRY BERNARD SHEPPARD,

Dec. 22, 1931.  H. B. SHEPPARD  1,837,590

MEANS FOR PUMPING LUBRICANT

Filed Sept. 8, 1928  2 Sheets-Sheet 2

Inventor
HENRY BERNARD SHEPPARD,
BY
Toulmin & Toulmin
Attorneys

Patented Dec. 22, 1931

1,837,590

UNITED STATES PATENT OFFICE

HENRY BERNARD SHEPPARD, OF DERBY, ENGLAND

MEANS FOR PUMPING LUBRICANT

Application filed September 8, 1928, Serial No. 304,705, and in Great Britain September 10, 1927.

This invention relates to means for pumping lubricant, more particularly for lubricating bearings, cylinders and other working parts of engines, machinery and the like.

According to this invention the method of supplying lubricant consists in compressing the lubricant in a container through the medium of a friction clutch operated by a ratchet device permitting the lubricant under pressure to be discharged into a distributing chamber and causing it to be delivered under pressure from said distributing chamber for use.

Apparatus for supplying or delivering lubricant in accordance with the beforementioned method may comprise a distributing chamber and rotatable sleeve therein, a pump, a container for the lubricant, a piston in said container adapted to be operated by a ratchet device, through the medium of a friction clutch, and means for operating the pump and the rotatable sleeve, the arrangement being such that when a predetermined pressure on the lubricant is reached, the friction clutch ceases to operate the piston while the pump will continue to deliver lubricant to the distributing chamber and the ratchet device to operate the rotatable sleeve, so that lubricant is delivered from the distributing chamber, and when the pressure on the lubricant is reduced the friction clutch comes into operation again, thus maintaining the lubricant in the container at the required predetermined pressure.

Means are provided whereby the required pressure to be maintained on the lubricant can be altered as required.

Referring to the drawings filed herewith:—

Figure 1:
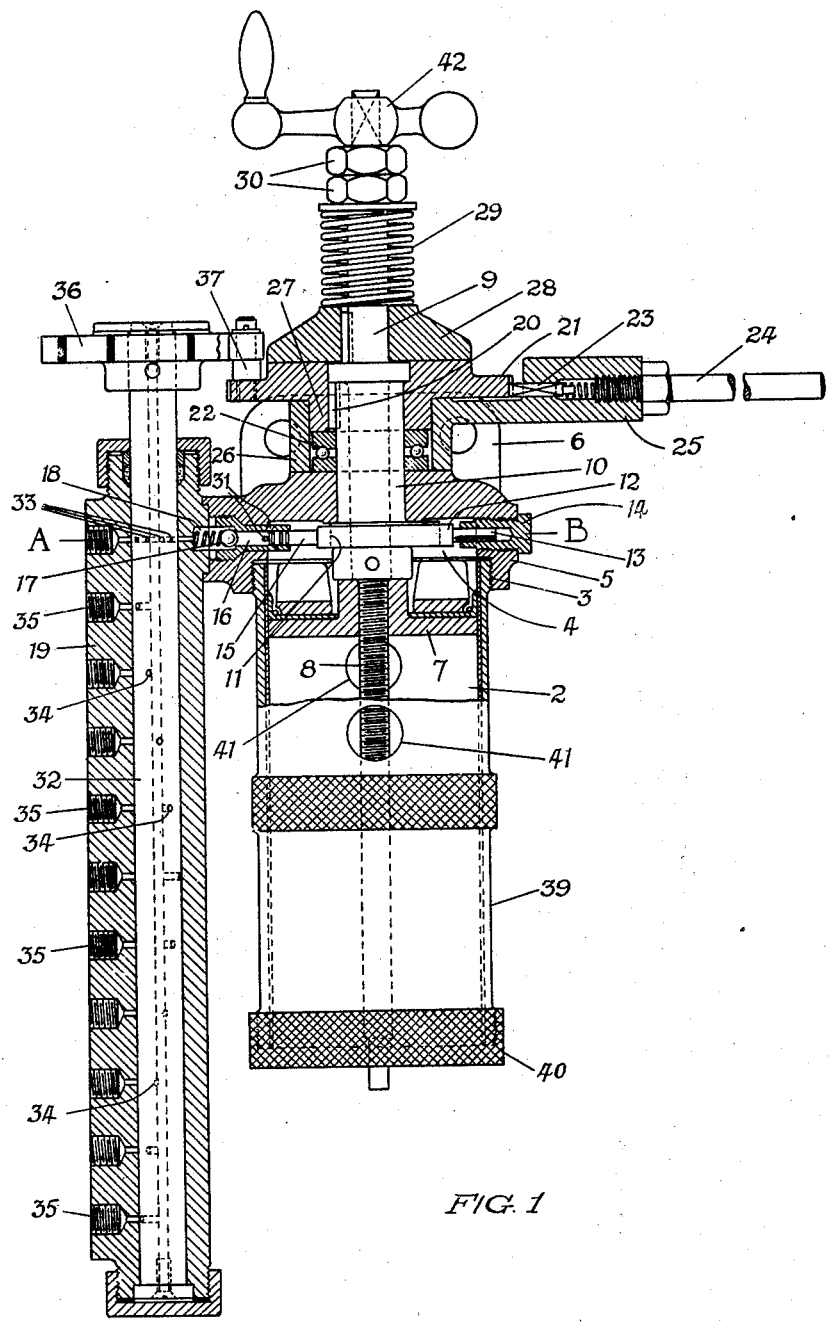
Fig. 1 is a sectional elevation of one form of apparatus made in accordance with this invention.
Figure 2:
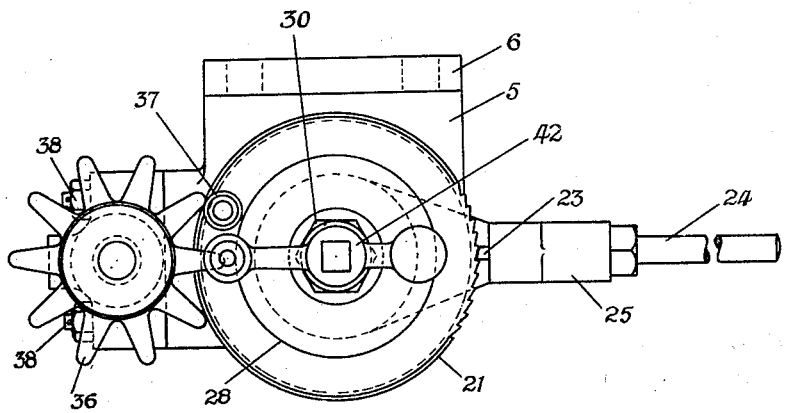
Fig. 2 is a plan.

2 is a container for lubricant which may be detachably secured by screw threads 3 in the mouth of a chamber 4 formed in a base 5 of a bracket 6. In the container 2 is a traversing piston 7 adapted to be operated by a screw threaded rotatable piston rod 8, which is connected to, or integrally combined with a driving spindle 9 mounted in the bracket 6. On the driving spindle 9 is a rotatable sleeve 10 carrying at its inner end an eccentric or cam 11 located in the chamber 4 and encircling this cam is a strap 12 which is adapted to be reciprocated transversely of the chamber 4 by rotation of the cam, said strap having a lateral stem 13 at one side which works in a guide 14 provided in the base 5 and at the other side with a stem 15 constituting a plunger at the inlet end of a small force pump 16 housed in the base 5 diametrically opposite to the guide 14. The pump 15 is provided with a non-return valve 17 at the outlet end which communicates with an inlet 18 of a distributing chamber 19. At the outer end of the rotatable sleeve 10 and keyed thereto by a key 20 is a ratchet wheel 21 and interposed between this ratchet wheel and the base 5 is a ball thrust washer 22. Engaging the ratchet wheel 21 is a pawl 23 operated by a lever 24 carried by an extension 25 of a collar 26 rotatably mounted over the ball thrust washer 22 and annular flange 27 of the ratchet wheel 21. Keyed to the spindle 9 is a friction plate 28 held in abutment with the outer face of the ratchet wheel 21 by a coil spring 29, the tension on the spring being effected by lock-nuts 30.

The inlet end of the force pump 16 is provided with inlets 31 for the passage of lubricant from the chamber 4, the latter being in open communication with the adjacent open end of the lubricant container 2.

In the distributing chamber 19 is a rotatable sleeve 32 having a plurality of radially disposed ports 33 adapted to communicate with the inlet 18 of the distributing chamber. The sleeve 32 is also provided with a plurality of delivering ports 34 longitudinally spaced apart and regularly staggered around its circumference, these ports being adapted on rotation of the sleeve 32, to register with discharge outlets 35 arranged in the distributing chamber 19. The discharge outlets 35 are or may be adapted for the attachment of suitable delivery pipes for conveying discharged lubricant to any convenient source.

One end of the sleeve 32 protrudes from the distributing chamber 19 whereat it is provided with a star-wheel 36 positioned so as to be engaged and thereby rotated by a lateral pin 37 projecting from the face of the ratchet wheel 21.

Figure 3:
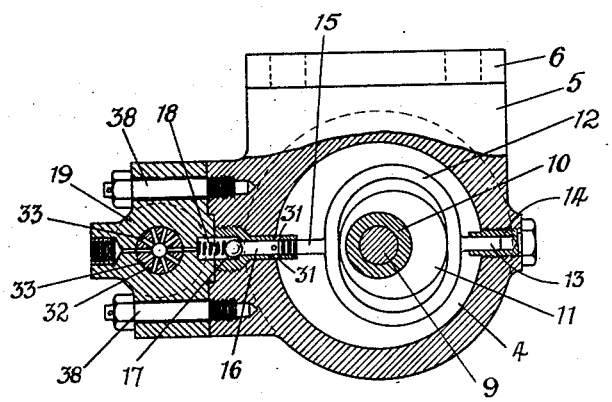
Fig. 3 is a cross section on the line A—B, Fig. 1.

The distributing chamber 19 may be attached to the bracket 5 by bolts 38, as seen in Fig. 3.

The lubricant container 2 may very conveniently comprise a hollow cylinder of celluloid containing a charge of semi-solid lubricant and encased by an outer cylinder 39 closed at the outer end by a screwed cap 40, such construction enabling fresh charges of lubricant to be made by recharging with the celluloid cartridge or container full of lubricant. For giving a sight of the lubricant in order to determine when a recharge is necessary, sight holes 41 are provided in the outer casing 39. In the construction illustrated, the piston 7 is shown in the position when a charge of lubricant is required and for retracting the piston to the outer end of the container, a hand lever 42 is provided at the extreme end of the spindle 9.

In operation, the lever 24 is operated by any suitable means in order to actuate the ratchet wheel 21. This causes the sleeve 10 and cam 11 to rotate, and the cam operating on the strap 12 effects reciprocation thereof. Assuming that no pressure of lubricant obtains in the container 2, the friction between the ratchet and the adjacent friction plate 28 is sufficient to rotate said friction plate which in turn rotates the spindle 9. Rotation of the spindle draws the piston forward against the lubricant in the container 2 until sufficient pressure is exerted on the lubricant to cause the friction plate 28 to slip.

As the strap 12 reciprocates, the lubricant now under pressure enters the pump 16 through the inlets 31 when uncovered by the plunger 15 and on forward movement of the plunger lubricant is forced past the non-return valve 17 into the distributing chamber 19. On the sleeve 32 being rotated through the medium of the star wheel 36 and the pin 37, the ports 33 communicate at intervals with the inlet 18 of the distributing chamber 19 and lubricant under pressure issues into the sleeve 32 to issue therefrom still under pressure into the various discharge outlets 35 as the delivery ports 34 register therewith. When the pressure on the lubricant in the container falls due to the discharge of the lubricant, the friction plate again operates until a pressure is again set up for the above operation to be repeated. The action therefore is such that the whole force of the pump operates on each discharge outlet 35 individually.

The load on the spring 29 can be altered to the pressure required to be maintained on the lubricant.

What I claim and desire to secure by Letters Patent is:—

1. Apparatus for mechanically supplying or delivering lubricant comprising a container for the lubricant, a lubricant compressing piston in said container, a lubricant receiving and distributing member, a pump connected with said lubricant container and said lubricant receiving and distributing member, means for operating the pump so as to pass lubricant from the container to the receiving and distributing member, frictional means associated, and automatically operable, with said pump operating means for operating the lubricant compressing piston in relation to a load on said frictional piston operating means, and means for effecting discharge of lubricant under pressure for use from the distributing member.

2. Apparatus for mechanically supplying or delivering lubricant comprising a container for the lubricant, a lubricant compressing piston in said container, a lubricant receiving and distributing member, a pump connected with said lubricant container and said lubricant receiving and distributing member, means for operating the pump so as to pass lubricant from the container to the receiving and distributing member, frictional means associated, and automatically operable, with said pump operating means for operating the lubricant compressing piston in relation to a load on said frictional piston operating means, and means operable through the medium of the pump operating means for effecting discharge of lubricant under pressure for use from the distributing member.

3. Apparatus for mechanically supplying or delivering lubricant comprising a container for the lubricant, a lubricant compressing piston in said container, a lubricant distributing chamber, a pump located between said distributing chamber and the lubricant container, means for operating the pump so as to pass lubricant from the container to the distributing chamber, frictional means associated with said pump operating means for operating the piston in relation to a load on said frictional piston operating means and means for permitting discharge of lubricant under pressure for use from the distributing chamber.

4. Apparatus for mechanically supplying or delivering lubricant comprising a container for the lubricant, a lubricant compressing piston in said container, a lubricant distributing chamber, lubricant discharging means associated with said distributing chamber, a pump located intermediate of the lubricant container and the distributing chamber and communicably operable to said lubricant container and said distributing chamber, means for operating the pump, frictional means associated with said pump operating means for operating the lubricant compressing piston in relation to a load on said frictional means, and means associated with the pump operating means for operating the lubricant discharging means to effect discharge of lubricant for use from the lubricant distributing chamber.

5. Apparatus for mechanically supplying or delivering lubricant comprising an open-mouthed lubricant container, a lubricant compressing piston in said container, a chamber adjacent the mouth of the lubricant container for receiving compressed lubricant, a lubricant distributing chamber, lubricant discharging means associated with said distributing chamber, a pump located intermediate of the lubricant container and the distributing chamber and communicably operable to said lubricant container and said distributing chamber, means for operating the pump, frictional means associated with said pump operating means for operating the lubricant compressing piston in relation to a load on said frictional means, means associated with the pump operating means for operating the lubricant discharging means to effect discharge of lubricant at several sources for use from the lubricant distributing chamber, means for operating the lubricant compressing piston independently of the pump operating means and means for varying the load on the frictional means.

6. Apparatus for mechanically supplying or delivering lubricant comprising a base, a structure combined with said base, a lubricant container detachably secured to said structure, an open end to said container combining with an adjacent mouth in the structure to constitute a lubricant receiving chamber, a piston in the lubricant container, a lubricant distributing chamber carried by the structure, lubricant discharging means associated with said distributing chamber, a pump located in the lubricant receiving chamber and adapted to feed lubricant from said receiving chamber to the distributing chamber, means for operating the pump, a friction clutch device associated therewith for operating the piston relative to a load on said friction clutch device, means associated with the pump operating means for operating the lubricant discharging means to effect delivering of lubricant at several sources for use from the lubricant distributing chamber, means for operating the piston independently of the pump operating means and means for varying the load on the friction clutch device.

In testimony whereof, I affix my signature.

HENRY BERNARD SHEPPARD.